Figure 1:
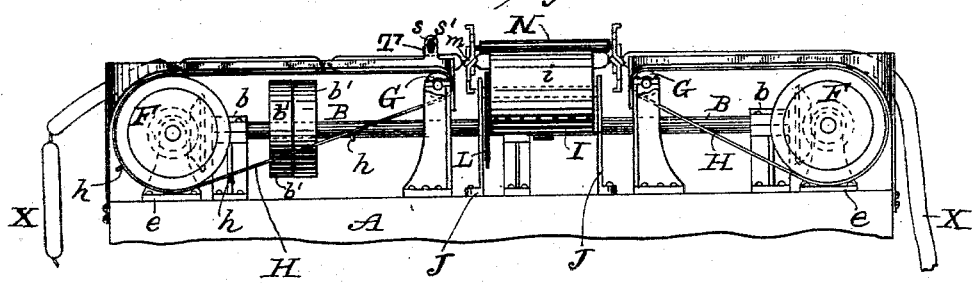

(No Model.) 2 Sheets—Sheet 1.

W. F. SCHÖNLAND.
SAUSAGE LINKING OR TWISTING MACHINE.

No. 589,578. Patented Sept. 7, 1897.

Witnesses
H. W. Eastman
A. L. Kavanaugh

Inventor
William F. Schönland
By his Attorney J. B. Thurston (No Model.) 2 Sheets—Sheet 2.
W. F. SCHÖNLAND.
SAUSAGE LINKING OR TWISTING MACHINE.
No. 589,578. Patented Sept. 7, 1897.
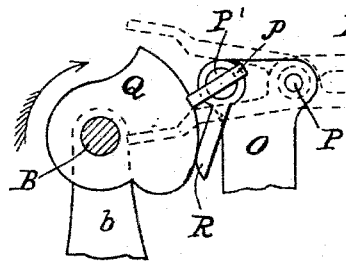
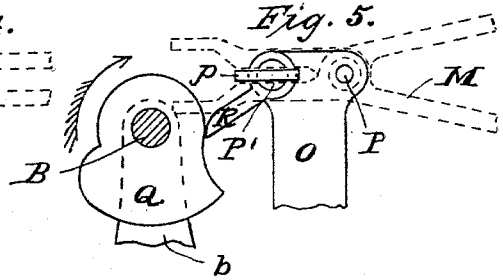
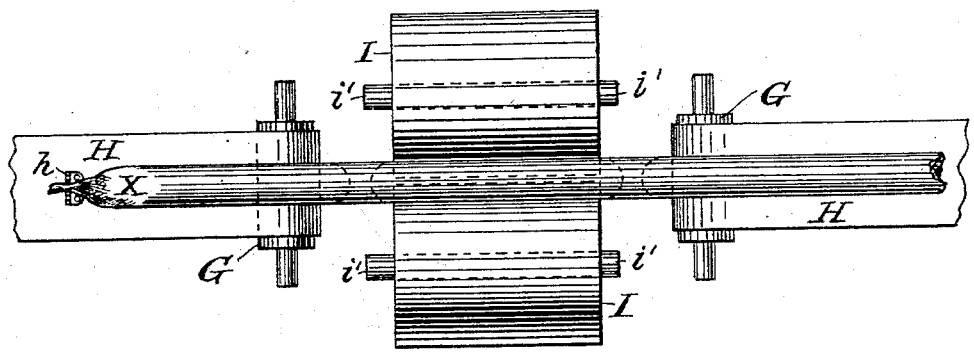
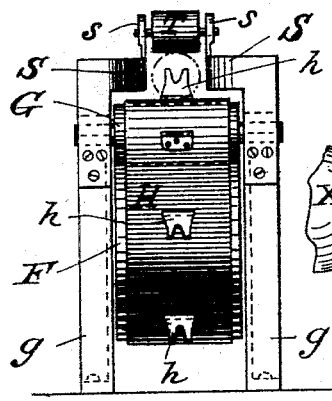
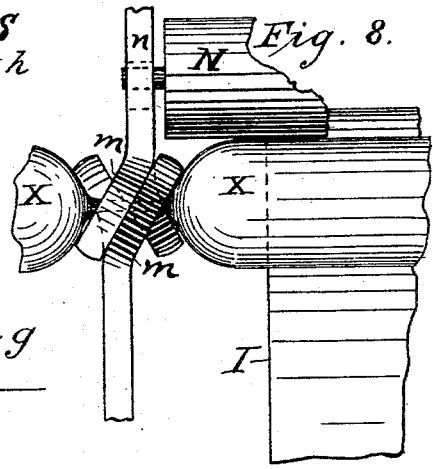
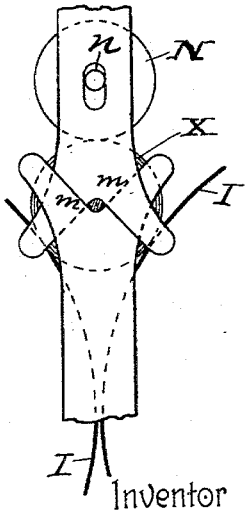
Witnesses
H. W. Eastman
A. L. Kavanaugh
Inventor
William F. Schönland
By his Attorney

UNITED STATES PATENT OFFICE.

WILLIAM F. SCHÖNLAND, OF MANCHESTER, NEW HAMPSHIRE.

SAUSAGE LINKING OR TWISTING MACHINE.

SPECIFICATION forming part of Letters Patent No. 589,578, dated September 7, 1897.

Application filed April 28, 1897. Serial No. 634,214. (No model.)

*To all whom it may concern:*

Be it known that I, WILLIAM F. SCHÖNLAND, a citizen of the United States, residing at Manchester, in the county of Hillsborough and State of New Hampshire, have invented certain new and useful Improvements in Sausage Linking or Twisting Machines; and I do hereby declare the following to be a full, clear, and exact description of the invention, such as will enable others skilled in the art to which it appertains to make and use the same.

This invention relates to means for parting, linking, or dividing a filled sausage-casing into connected sausages of the desired length. This has commonly been done by hand, but it consumes quite a little time to link a full-length casing, and if this time can be mostly saved greatly increased profit to the manufacturer would result.

To this end the object of my invention is to provide a machine which will accurately divide filled sausage-casings into sausages of any desired length more rapidly and better than it can be done by hand.

The invention consists in the novel feeding, clamping, and twisting mechanism, as fully set forth in the following specification and claims and clearly illustrated in the drawings accompanying and forming a part of the same, of which—

Figure 2:
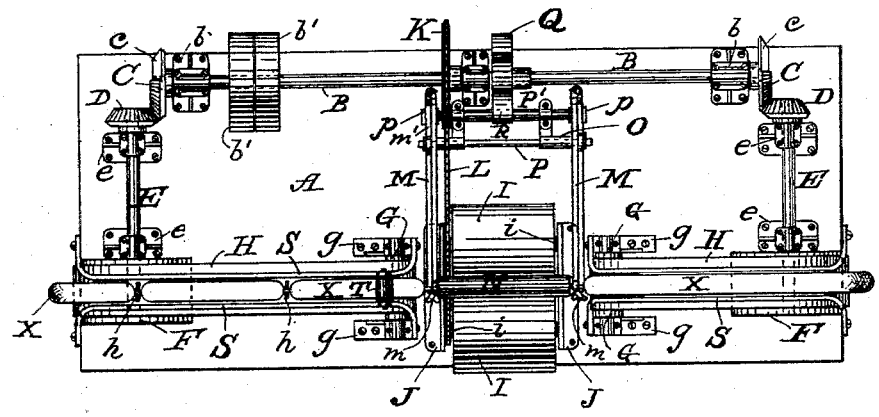
Figure 3:
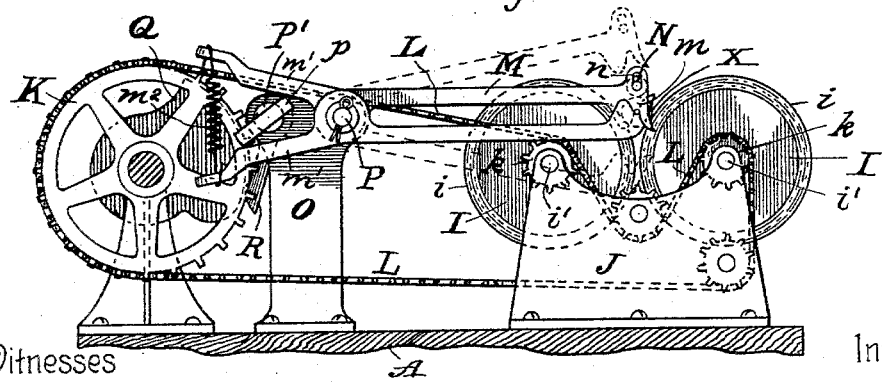

Figure 1 is a front elevation of my improved machine, Fig. 2 being a general plan view. Fig. 3 is an enlarged elevation showing the clamping and twisting mechanism in detail. Figs. 4 and 5 are enlarged details of portions of the clamping mechanism. Fig. 6 is a broken plan view showing the twisting-rolls with portions of the carrying-belts and of a filled sausage-casing, all in proper relative position and on an enlarged scale. Fig. 7 is an elevation showing in detail one of the carrying-belts with its guides and pressure-roll and having the sausage in dotted lines. Figs. 8 and 9 are enlarged broken elevations illustrating the gripping and twisting mechanism.

Similar reference-letters indicate like parts in all the views.

To carry my invention into effect, I provide carrying-belts and twisting-pulleys running at right angles to each other, as will be shown and described. These carrier-belts are arranged to move the sausage-casing to a proper position to be clamped at each side of the twisting-rolls and then to stop while the clamps and twisting-rolls do their work, when said carrier-belts again start in motion.

Referring to the drawings by letters, A represents a suitable base or frame upon which my machine is set up.

B is a driving-shaft supported in bearings $b$ and carrying tight and loose pulleys $b'$ and at each end a beveled gear-segment C, which move the sausage-carrying belts by meshing with the beveled pinions D, mounted upon counter-shafts E, supported in bearings $e\ e$ and carrying each a pulley F. At the proper point between these shafts E are bearings $g$, which carry a roll G, the sausage-carrying belts H being each passed around a pair of these pulleys or rolls F G, as seen in Figs. 1 and 2, one of which belts is provided with grooved clips or rests $h$, secured thereon at regular intervals and at proper distances apart to equal the length of the sausages which are being passed over the belts, thus insuring the movement of the sausage and the belts in unison; but the movement of the sausage-casing must discontinue at intervals long enough to part or divide and twist them into the desired length, and for this reason I remove the teeth from a portion of the beveled gears C C, thus leaving the blank surfaces $c$, as the shaft B moves continuously, to provide for revolving or twisting the sausage while its longitudinal movement is discontinued. One simple means of accomplishing this is shown in the drawings, and consists in part of a pair of rolls I, placed adjacent to but not in contact with each other and located between the rolls G and at right angles therewith, the journals of said rolls I being equidistant from the longitudinal center of the belts H and the proper height to cause a sausage X, when spanning the space between the belts H, to come in contact with both said rolls I, which are caused to revolve in like direction one with the other by means of sprocket-wheels K $k$ and a chain L, the sprocket K being mounted on the shaft B and the sprockets $k$ on the journals $i$ of the rolls I, idlers $k'$ being carried on one of the standards or bearings J, so as to cause the chain to pass over the sprockets $k$ at the proper angle to perform its function.

The other essential features in connection with the rolls I are the sausage compressing or linking jaws, which may be bent, as shown, so as to cross each other when performing their work. A pair of these jaws $m$ may be placed one at each end of the rolls I and be operated toward and away from each other by any convenient means so long as such operation occurs at the proper time to cause the jaws to bear at opposite sides of the sausage X the moment its longitudinal movement ceases, their compression to continue until the meat within the sausage-casing shall have been pressed to either side of said jaws $m$, which divides the sausages into the required links. A pressure-roll N, which is carried in loose bearings $n$, formed upon or attached to one of each pair of jaws $m$, bears down upon the sausage-casing with sufficient force to cause it to be rapidly revolved by means of the rolls I, upon which it rests, which twists the casing between said jaws and at the points indicated by dotted lines in Fig. 6 to a small size, as seen in Figs. 8 and 9.

The clamping-jaws $m$ may be variously operated, this being effected in a simple manner when attached to or formed upon the ends of bars M, which are shown in the drawings pivotally attached to a shaft P, carried in bearings O, said bearings also carrying another shaft P', the outer ends of which are provided with a laterally-disposed bar $p$, its ends extending at opposite sides of said shaft. These bars $p$ rest between the rear ends $m'$ of the bars M, normally in the position seen in Figs. 3 and 5, but when the shaft P' is rotated the ends $m'$ of the bars M are spread, as seen in Figs. 3 and 4, which movement causes the jaws $m$ to close tightly upon the sausage-casing, as seen best in Figs. 3, 8, and 9. In order to give to this shaft P' the slight rotative movement required at the proper time, a suitable cam Q may be attached to the shaft B and adapted to operate an arm R, carried upon the shaft P', as seen best in Figs. 4 and 5, and in order to normally hold the bars M apart, so as to keep the jaws $m$ separated, a helical spring $m^2$ may be attached to ends $m'$ of the bars M, as clearly shown in Fig. 3.

The sausage-casing and divided or linked sausages X may be guided in passing upon the belts H by the guides S, those serving the purpose for the belt having the link-clips $h$, being provided near one end with suitable ears $s$, in which are formed vertically-elongated openings $s'$, forming bearings for the journals of a pressure-roll T, as shown in Figs. 1, 2, and 7, which assists the adhesion of the sausage-casing to the carrier-belt.

Having described my invention, what I claim is—

1. In a sausage-linking apparatus, a pair of rolls placed adjacent to each other and rotating both in the same direction, a suitable sausage-clamping device at either end of said rolls, and suitable means for intermittently moving a filled sausage-casing across said rolls.

2. In a sausage-linking apparatus, a pair of intermittently-movable sausage-carriers, a pair of rolls both rotating in the same direction placed adjacent to each other at right angles with and between said sausage-carriers, and a suitable gripping or sausage-clamping device at each end of said rolls.

3. In a sausage-linking apparatus, horizontally-movable sausage-casing carriers, a pair of rolls located between and revolving at right angles therewith, a pair of jaws adapted to divide or compress the sausage-casing at each end of said rolls, and means for moving said carriers intermittently, substantially for the purpose set forth.

4. In a machine of the character described, suitable belts adapted to carry sausage-casings longitudinally and to move intermittently, a pair of linking-jaws, and suitable rolls rotating in a course at right angles with said belt and between said jaws and adapted to twist the sausage-casing into the required links.

5. In a machine of the character described, a pair of carrier-belts passed each over a pair of pulleys, both belts running in longitudinal alinement and at opposite ends of a sausage twisting and clamping mechanism, said twisting and clamping mechanism, and suitable rests or clips attached to one of said carrier-belts for receiving the links of the sausage-casing.

In testimony whereof I affix my signature in presence of two witnesses.

WILLIAM F. SCHÖNLAND.

Witnesses:
J. B. THURSTON,
EMILE H. TARDIVEL.